O. F. NEFF.
ATTACHMENT FOR AUTOMOBILES.
APPLICATION FILED SEPT. 21, 1909.
972,020.
Patented Oct. 4, 1910.
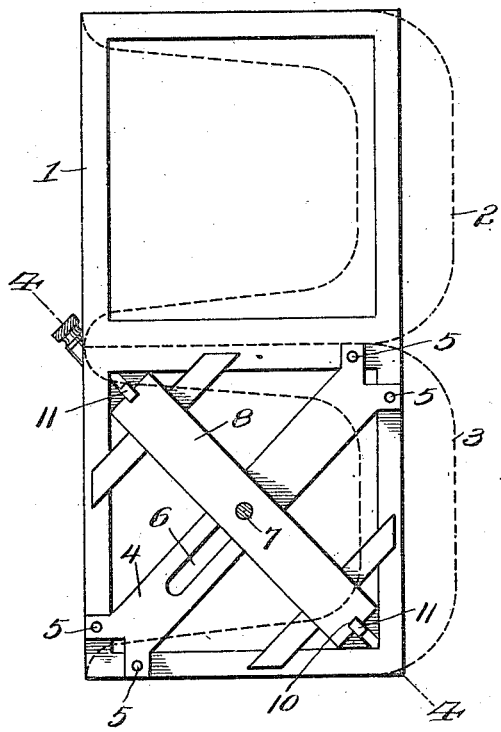
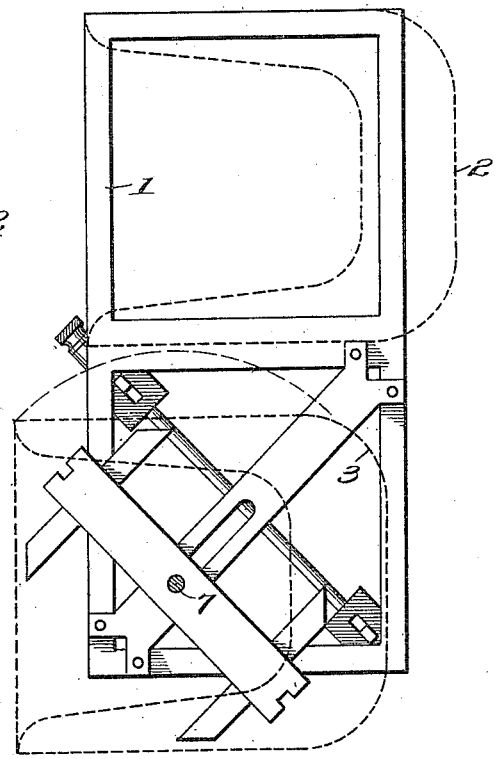
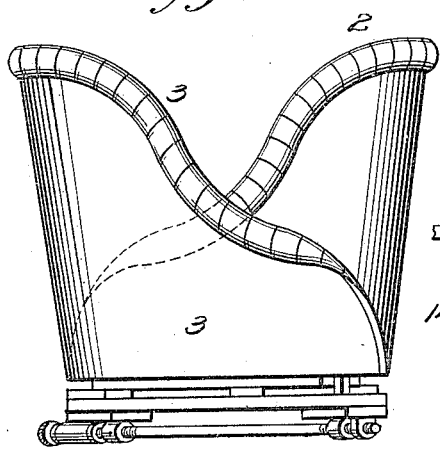
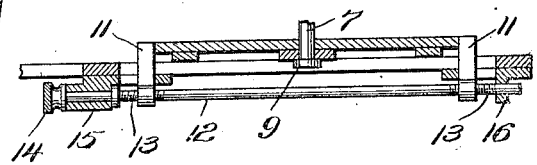
Inventor
Omar F. Neff
Witnesses
Edwin G. McKee
P. M. Smith
By Victor J. Evans
Attorney

UNITED STATES PATENT OFFICE.

OMAR F. NEFF, OF MILFORD, INDIANA.

ATTACHMENT FOR AUTOMOBILES.

972,020.  Specification of Letters Patent.  Patented Oct. 4, 1910.

Application filed September 21, 1909. Serial No. 518,736.

*To all whom it may concern:*

Be it known that I, OMAR F. NEFF, a citizen of the United States, residing at Milford, in the county of Kosciusko and State of Indiana, have invented new and useful Improvements in Attachments for Automobiles, of which the following is a specification.

This invention relates to vehicle seats, the object of the invention being to provide a seat which is especially designed for use upon automobiles wherein it is frequently desirable to have one or more of the seats reversible so that the occupant of the seat may face either forward or backward. This is particularly desirable in connection with the forward pair of seats one of which is usually occupied by the driver of the machine, it being awkward for the occupant of the remaining front seat to turn his head sufficiently to carry on conversation with the remaining occupants of the vehicle, in the rear seat.

The object of this invention is to provide a construction of seat and seat frame which will enable the seat to be readily reversed from front to rear and readjusted in a convenient, practical and reliable manner.

A further object of the invention is to provide what may be termed an expansive seat whereby additional seats may be provided upon the body of the machine according to the desired capacity.

With the above and other objects in view, the nature of which will more fully appear as the description proceeds, the invention consists in the novel construction, combination and arrangement of parts as herein fully described, illustrated and claimed.

In the accompanying drawings:—Figure 1 is a top plane view of a seat frame adapted for operation in accordance with the present invention. Fig. 2 is a similar view, showing by full and dotted lines one of the steps in the operation of reversing one of the front seats. Fig. 3 is a side elevation, showing the front seats having a reversed relation to each other. Fig. 4 is a detail vertical section taken in line with the clamp shaft of the reversible seat.

Referring to Figs. 1 to 4 inclusive of the drawings, 1 designates a seat frame which in the main is of the ordinary construction and adapted for the support of two seats indicated by dotted lines respectively at 2 and 3 in Figs. 1 and 2 and by full lines in Fig. 3.

In carrying out the present invention, I secure a supporting bar 4 to the seat frame 1, as shown in Figs. 1 and 2, said bar extending diagonally of one-half of the seat frame 1 and being terminally secured thereto at 5. This supporting bar is provided with a longitudinal slot 6 through which passes a center or pivot pin 7 which is connected at its upper end to the bottom of the seat 3.

8 designates a diagonal seat bottom bar or in other words, a bar which is fastened to the bottom of the seat and which extends diagonally thereof as indicated in Figs. 1 and 2. The center pin or pivot 7 passes through the bar and is adapted to slide back and forth in the slot 6 in the supporting bar 4, said pin being headed beneath the bar 4 as shown at 9. The opposite ends of the bar 8 are notched as shown at 10 to receive a pair of oppositely movable clamps or keys 11 having threaded openings through which passes an operating clamp shaft 12 provided with right and left hand screw threads as shown at 13 whereby the clamps or keys 11 are simultaneously moved in opposite directions when said shaft 12 is rotated which may be accomplished by means of a milled head or hand piece 14. The shaft 12 is journaled in suitable bearings 15 and 16 connected with the seat frame and the clamps or keys serve merely to lock the bar 8 in place and unlock the same so as to enable the seat and the bar 8 connected rigidly thereto to be moved from the position shown in Fig. 1 to the position shown in Fig. 2, which will leave ample clearness or space for the seat 3 to be turned upon the pivot 7 as a center until said seat occupies a reversed position as shown in Fig. 3 enabling the occupant of said seat to face rearward.

I claim:—

1. A vehicle seat comprising a seat frame, a seat fastened permanently to said seat frame and occupying approximately one-half thereof, a second seat adapted to occupy the remaining half of the seat frame, a pivot pin extending from the bottom of the second seat, a slotted bar fastened to the seat frame and receiving said pin, and screw actuated means on the seat frame for clamping and releasing the second seat, whereby said second seat may be shifted and thrown to face either forward or backward, substantially as described.

2. A vehicle seat comprising a double seat frame, a seat occupying substantially one-half of said seat frame and fastened permanently thereto, a second seat occupying the remaining half of the seat frame, and means for shifting and reversing said second seat comprising a bottom bar extending diagonally of and secured to the seat, a pivot pin extending downward from said bottom bar, a bar extending diagonally of and secured to the seat frame and provided with a longitudinal slot in which said pin works, a clamp shaft journaled in bearings on the seat frame, and a pair of clamps operable simultaneously in opposite directions by said clamp and shaft and movable into and out of engagement with said bar on the bottom of the seat, substantially as described.

3. The combination of a seat frame, a pivoted and laterally movable seat including a notched member, devices movably mounted on the frame to releasably engage in the notches of the member, and an operating screw mounted on the frame to actuate the devices.

4. The combination of a vehicle frame having a diagonal slot, a seat disposed over the frame, a bar secured to the seat and having notched extremities, a pivot on the bar slidably engaged in the slot, devices on the frame for releasably engaging the notched extremities of the bar, and means for actuating the devices.

5. The combination of a vehicle frame having a diagonal slot, a seat disposed over the frame, a bar secured to the seat and having notched extremities, a pivot on the bar slidably engaged in the slot, devices on the frame for releasably engaging the notched extremities of the bar, and an actuating screw for moving the devices, said screw being rotatably mounted on the seat frame and having means on one extremity located outside the seat frame for turning the screw.

In testimony whereof I affix my signature in presence of two witnesses.

OMAR F. NEFF.

Witnesses:
ZILER GROVE,
NORMAN J. GROVES.